(12) United States Patent
James et al.

(10) Patent No.: US 12,235,867 B2
(45) Date of Patent: Feb. 25, 2025

(54) REPLICATION PROGRESS TRACKING TECHNIQUE

(71) Applicant: Nutanix, Inc., San Jose, CA (US)

(72) Inventors: Freddy James, Maharastra (IN); Kai Tan, Cary, NC (US); Karthikeyan Vaideswaran, Morrisville, NC (US); Ramya Uthamarajan, Cary, NC (US); Kushagra Mishra, Cary, NC (US); Pranab Patnaik, Cary, NC (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/236,251

(22) Filed: Aug. 21, 2023

(65) Prior Publication Data

US 2024/0311392 A1    Sep. 19, 2024

(30) Foreign Application Priority Data

Mar. 14, 2023 (IN) .............................. 202341016940

(51) Int. Cl.
*G06F 16/27* (2019.01)

(52) U.S. Cl.
CPC .................................. *G06F 16/27* (2019.01)

(58) Field of Classification Search
None
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron et al. |
| 9,009,106 B1 | 4/2015 | Aron et al. |
| 9,069,708 B2 | 6/2015 | Gill et al. |
| 9,336,132 B1 | 5/2016 | Aron et al. |
| 9,641,580 B2 * | 5/2017 | Zhou ................... G06F 11/1438 |
| 9,652,265 B1 | 5/2017 | Narayanasamy et al. |
| 9,747,287 B1 | 8/2017 | Bhardwaj et al. |
| 9,767,178 B2 * | 9/2017 | Srivastava .............. G06F 11/14 |
| 9,772,866 B1 | 9/2017 | Aron et al. |
| 10,642,861 B2 * | 5/2020 | Srivastava .......... G06F 11/2038 |
| 11,436,097 B1 | 9/2022 | Kumar et al. |

(Continued)

OTHER PUBLICATIONS

Cano, Ignacio, "Curator: Self-Managing Storage for Enterprise Clusters" University of Washington; published Mar. 2017; pp. all.

(Continued)

*Primary Examiner* — Kim T Nguyen
(74) *Attorney, Agent, or Firm* — Cesari and McKenna, LLP

(57) ABSTRACT

A replication progress tracking technique is configured to present progress tracking state relating to data replicated as a recovery point (RP) from a source site to one or more target and/or remote sites over a network in a multi-site data replication environment. The progress tracking state of the replicated RP, i.e., RP replication progress, is persistently stored as a progress tracking recording at the target site independent of the source site of the replication and presented (i.e., viewed) using a well-defined, published application programming interface that is publicly callable by one or more clients of the environment.

30 Claims, 7 Drawing Sheets

(56) References Cited

U.S. PATENT DOCUMENTS

| | | | |
|---|---|---|---|
| 11,575,745 B2 | 2/2023 | Tatiparthi et al. | |
| 2015/0120659 A1* | 4/2015 | Srivastava | G06F 16/27 |
| | | | 707/625 |
| 2017/0212817 A1* | 7/2017 | Srivastava | G06F 11/14 |
| 2018/0081549 A1* | 3/2018 | Miller | G06F 3/0619 |
| 2021/0056119 A1* | 2/2021 | Majmudar | G06F 16/27 |
| 2022/0374316 A1 | 11/2022 | Kumar | |
| 2022/0398163 A1 | 12/2022 | Bezbaruah et al. | |
| 2023/0080691 A1 | 3/2023 | Gupta et al. | |
| 2023/0205653 A1 | 6/2023 | Gupta et al. | |
| 2024/0272991 A1* | 8/2024 | Gupta | G06F 16/128 |
| 2024/0311254 A1* | 9/2024 | Gupta | G06F 11/1469 |
| 2024/0311392 A1* | 9/2024 | James | G06F 16/27 |
| 2024/0330118 A1* | 10/2024 | Shrivastava | G06F 11/1466 |
| 2024/0330119 A1* | 10/2024 | Gupta | G06F 11/1464 |

OTHER PUBLICATIONS

Citrix XenDesktop 7.1 on Microsoft Hyper-V Server 2012 R2 on Nutanix Virtual Computing Platform Solution Design Citrix Validated Solutions, Jun. 25, 2014, 95 pages.

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible—Classic Edition" from https://nutanixbible.com/, dated Nov. 29, 2023, 276 pages.

* cited by examiner

REPLICATION PROGRESS TRACKING TECHNIQUE

CROSS-REFERENCE TO RELATED APPLICATION

The present application claims the benefit of India Provisional Patent Application Ser. No. 202341016940, which was filed on Mar. 14, 2023, by Freddy James, et al. for REPLICATION PROGRESS TRACKING TECHNIQUE, which is hereby incorporated by reference.

BACKGROUND

Technical Field

The present disclosure relates to data replication and, more specifically, to data replication in a multi-site data replication environment.

Background Information

Data replication generally involves copying data among multiple datacenters, e.g., sites, to enable continued operation of data processing operations in a multi-site data replication environment, such as backup and disaster recovery. As used herein, the multi-site data replication environment includes two or more sites that are often geographically separated by relatively large distances and connected over a communication network, e.g., a wide area network. For example, data at a local site may be replicated over the network to one or more remote sites located at geographically separated distances to ensure continued data processing operations in the event of a failure of the primary site.

Data may be replicated between the sites such that each update to the data at the local site (source) is copied to one or more remote sites (targets or remotes). However, copying of each data update typically results in constant transfer of data over networks spanning geographical areas in the multi-site data replication environment, which may be costly and expensive, as the network is often poorly utilized leading to needless replication with commensurate bandwidth reduction. Moreover, replication from the source to the target and/or remote may occur over a lossy network, where ordered replication (e.g., sequential data replication) may be greatly affected as a data sequence may be disparately impacted by a minor data loss. For example, a "slow" block somewhere at the start of a replication range may prevent the "highest completed offset" from moving forward, which may result in a large part of the replication range being restarted even though most blocks in the range have been replicated.

In addition, the multi-site environments typically track replication progress only at the source. Although this works well in a simple source-to-target bilateral configuration, progress tracking at the source is not useful in a multi-site configuration involving replication between different pairs of sites, e.g., if the source is down and replication is restarted from the beginning between the target and remote, which results in delayed protection of an entity at target.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
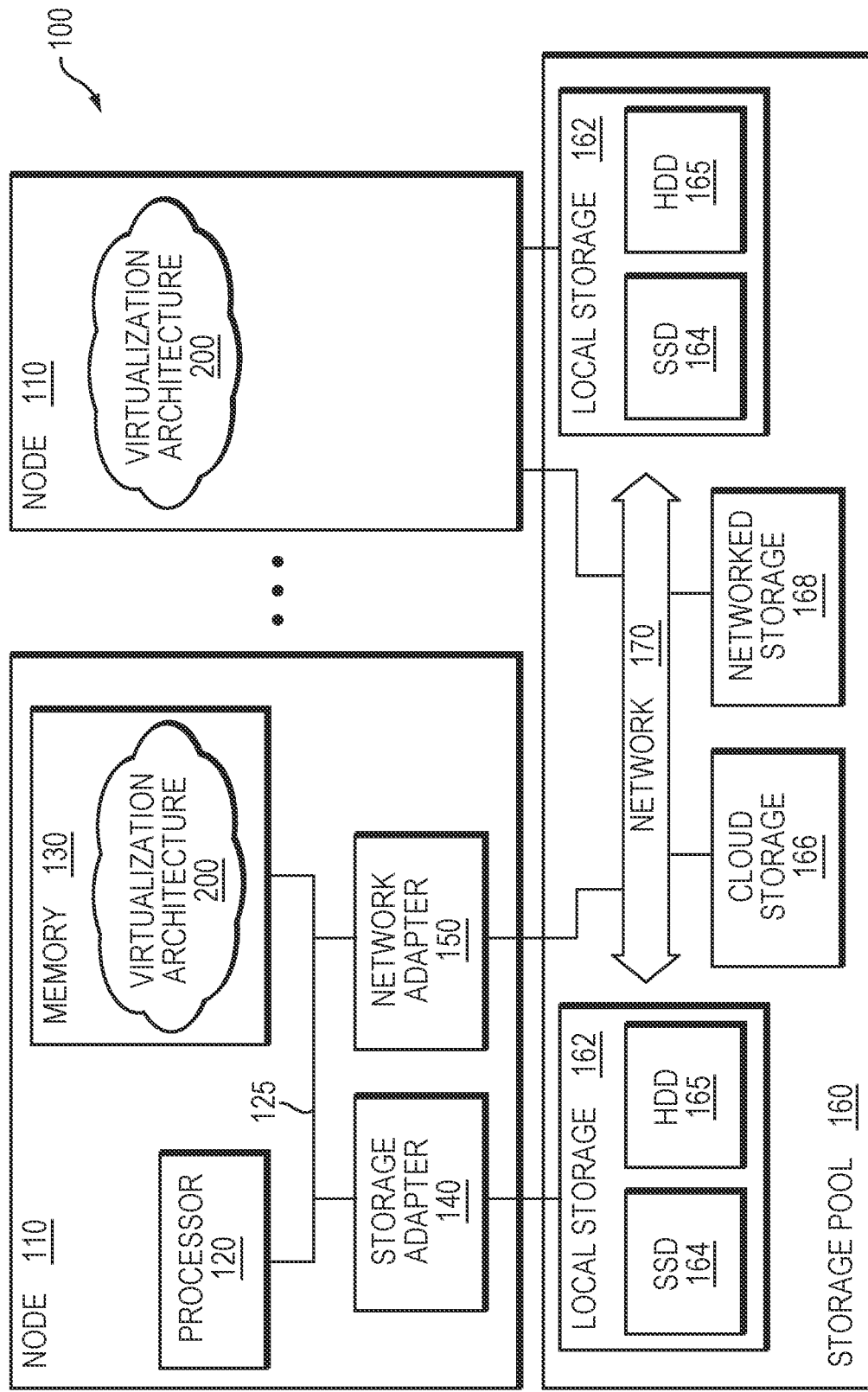
FIG. 1 is a block diagram of a plurality of nodes interconnected as a cluster in a virtualized environment.

The embodiments described herein are directed to a technique configured to present progress tracking state relating to data replicated as a recovery point (RP) from a source site to one or more target and/or remote sites over a network in a multi-site data replication environment. The progress tracking state of the replicating RP, i.e., RP replication progress, is repeatedly persistently stored as a progress tracking recording (record) at the target site (target) independent of the source site (source) of the replication and presented (i.e., viewed) using a well-defined, published application programming interface (API) that is publicly callable by one or more clients of the environment.

In an embodiment, various progress tracking modes may be employed to present (i.e., view) the state of the RP replication progress via the publicly callable API ("public API"). The various progress tracking modes may be employed to identify dropped or missing data ranges ("holes") that may have occurred during replication from the source to the target. That is, a client utilizing the public API may return missing (i.e., unacknowledged or incomplete) data ranges in the replication as a fine-grained tracking aspect of the RP replication progress to identify and fill-in the holes associated with ranges of data dropped during RP replication over the network. The dropped or missing data ranges may then be re-replicated, without having to re-send data that has been already successfully replicated to the target.

Illustratively, the public API may be embodied as a viewer configured to manage (e.g., query and/or set) information constituting the state of the RP replication progress. To that end, the replication progress tracking technique includes two instances of the public API: a Query RP replication API and a Set RP replication progress API. The Query RP replication API is configured to query (request) information about the RP and elicit a Get RP response that includes progress tracking state describing the RP replication status (e.g., partially complete). The Set RP replication progress API is configured to set the progress tracking mode to be used and corresponds to a type of replication progress tracking state to be recorded. The Set RP replication progress API may be called initially to establish the progress tracking mode used to record the type of progress tracking state stored at the target.

Advantageously, the replication progress tracking technique allows one or more clients to view state, e.g., at the target, pertaining to replication of one or more RPs between a source and a target and/or remote, and subsequently recover dropped or missing data ranges identified by the state across sites without having to restart the entire replication procedure. The technique is particularly useful for deployments where large amounts of data are replicated over slow (or expensive) networks, such as when replicating data to a cloud. In other words, it is desirable to avoid needless re-replication of previously successfully replicated data, particularly with respect to costly replication to/from the cloud.

DESCRIPTION

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the nodes of cluster 100 and remote nodes of a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network may be affected by exchanging discrete frames or packets of data according to protocols, such as the Transmission Control Protocol/Internet Protocol (TCP/IP) and User Datagram Protocol (UDP), as well as protocols for authentication, such as the OpenID Connect (OIDC) protocol, and other protocols for secure transmission, such as the HyperText Transfer Protocol Secure (HTTPS) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
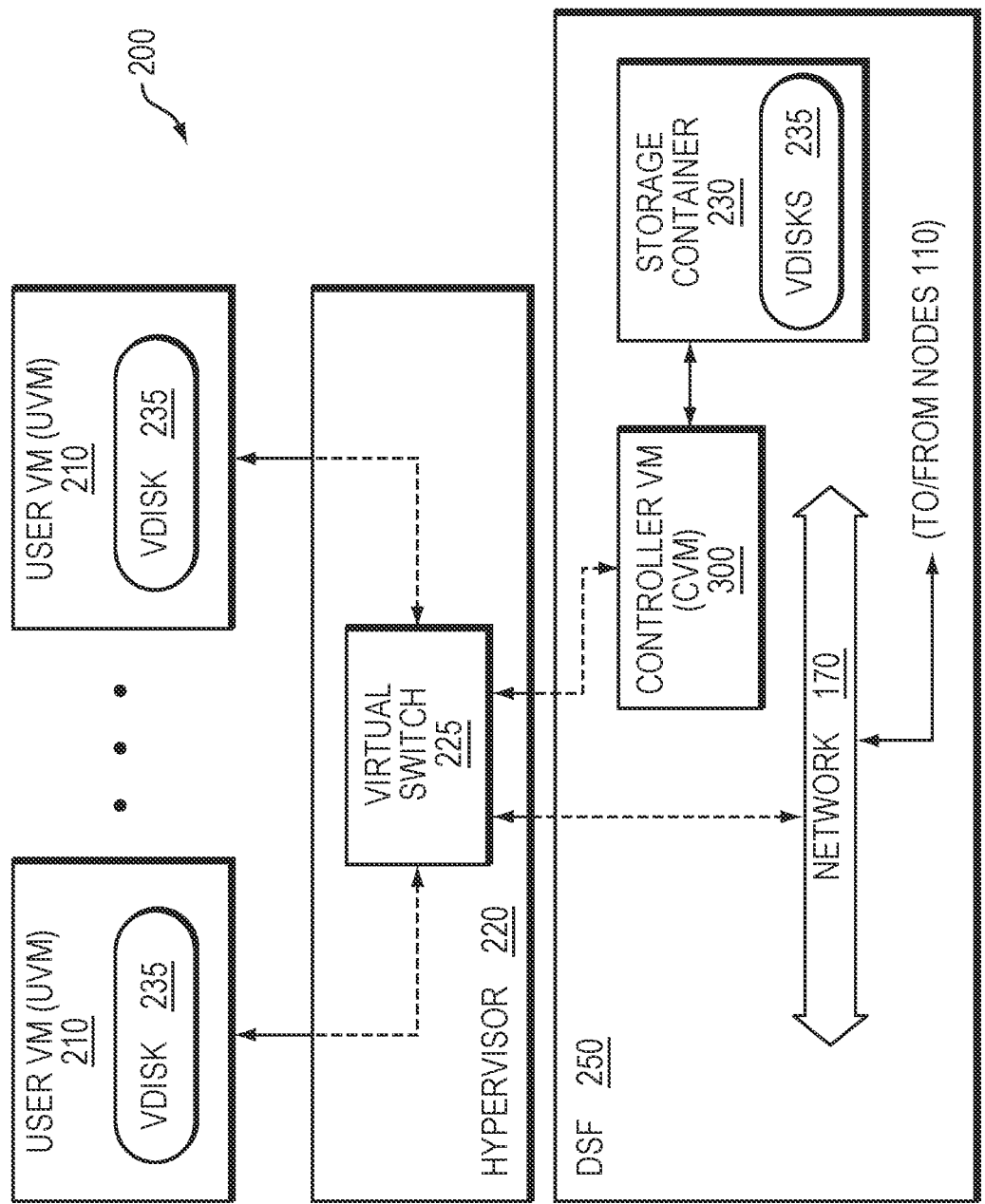
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

The client software (e.g., applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI, CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI. CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably the IP-based storage protocol request packets may remain in the node 110 when the communication—the request and the response—begins and ends within the hypervisor 220. In other embodiments, the IP-based storage protocol request may be routed by the virtual switch 225 to a CVM 300 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
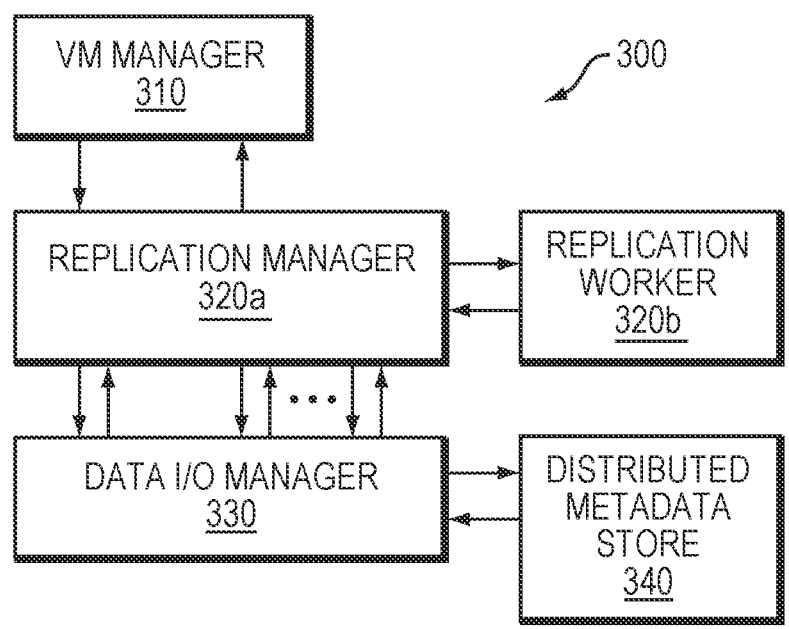
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in variety of different operating environments due to the broad interoperability of the industry standard IP-based storage protocols (e.g., iSCSI. CIFS, and NFS) supported by the CVM.

Illustratively, the CVM 300 includes a plurality of processes embodied as a storage stack that may be decomposed into a plurality of threads running in a user space of the operating system of the CVM to provide storage and I/O management services within DSF 250. In an embodiment, the user mode processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A replication manager 320a is configured to provide replication and disaster recovery services of DSF 250. In an embodiment, the replication manager 320a may also interact with one or more replication workers 320b. A data I/O manager 330 is responsible for all data management and I/O operations in DSF 250 and provides a main interface to/from the hypervisor 220, e.g., via the IP-based storage protocols. Illustratively, the data I/O manager 330 presents a vdisk 235 to the UVM 210 in order to service I/O access requests by the UVM to the DFS. A distributed metadata store 340 stores and manages all metadata in the node/cluster, including metadata structures that store metadata used to locate (map) the actual content of vdisks on the storage devices of the cluster.

Data replication generally involves copying data among one or more nodes 110 of clusters 100 embodied as, e.g., datacenters to enable continued operation of data processing operations in a multi-site data replication environment, such as backup and disaster recovery. The multi-site data replication environment includes two or more datacenters, i.e., sites, which are typically geographically separated by relatively large distances and connected over a communication network, such as a WAN. For example, data at a local datacenter (source site) may be replicated over the network to one or more remote datacenters (target and/or remote sites) located at geographically separated distances to ensure continuity of data processing operations in the event of a failure of the nodes at the source site.

Synchronous replication may be used to replicate the data between the sites such that each update to the data at the source site (source) is copied to the target site (target) and/or remote site (remote). For instance, every update (e.g., write operation) issued by a UVM 210 to data designated for failover (i.e., failover data) is continuously replicated from the source to the target before the write operation is acknowledged to the UVM. Thus, if the source fails, the target has an exact (i.e., mirror copy) of the failover data at all times. Synchronous replication generally does not require the use of snapshots of the data; however, to establish a multi-site data replication environment or to facilitate recovery from, e.g., network outages in such an environment, a snapshot may be employed to establish a point-in-time reference from which the sites can (re)synchronize the failover data.

In the absence of continuous synchronous replication between the sites, the current state of the failover data at the remote always "lags behind" (is not synchronized with) that of the source resulting in possible data loss in the event of a failure of the source. If a specified amount of time lag in synchronization is tolerable (e.g., 60 mins), then asynchronous (incremental) replication may be selected between the sites, for example, a point-in-time image replication from the source to the target (or remote) is not more than 60 minutes behind. Incremental replication generally involves at least two point-in-time images or snapshots of the data to be replicated, e.g., a base snapshot that is used as a reference and a current snapshot that is used to identify incremental changes to the data since the base snapshot. To facilitate efficient incremental replication in a multi-site data protection environment, a base snapshot is required at each site. Note that the data may include an entire state of a virtual machine including associated storage objects.

Figure 4:
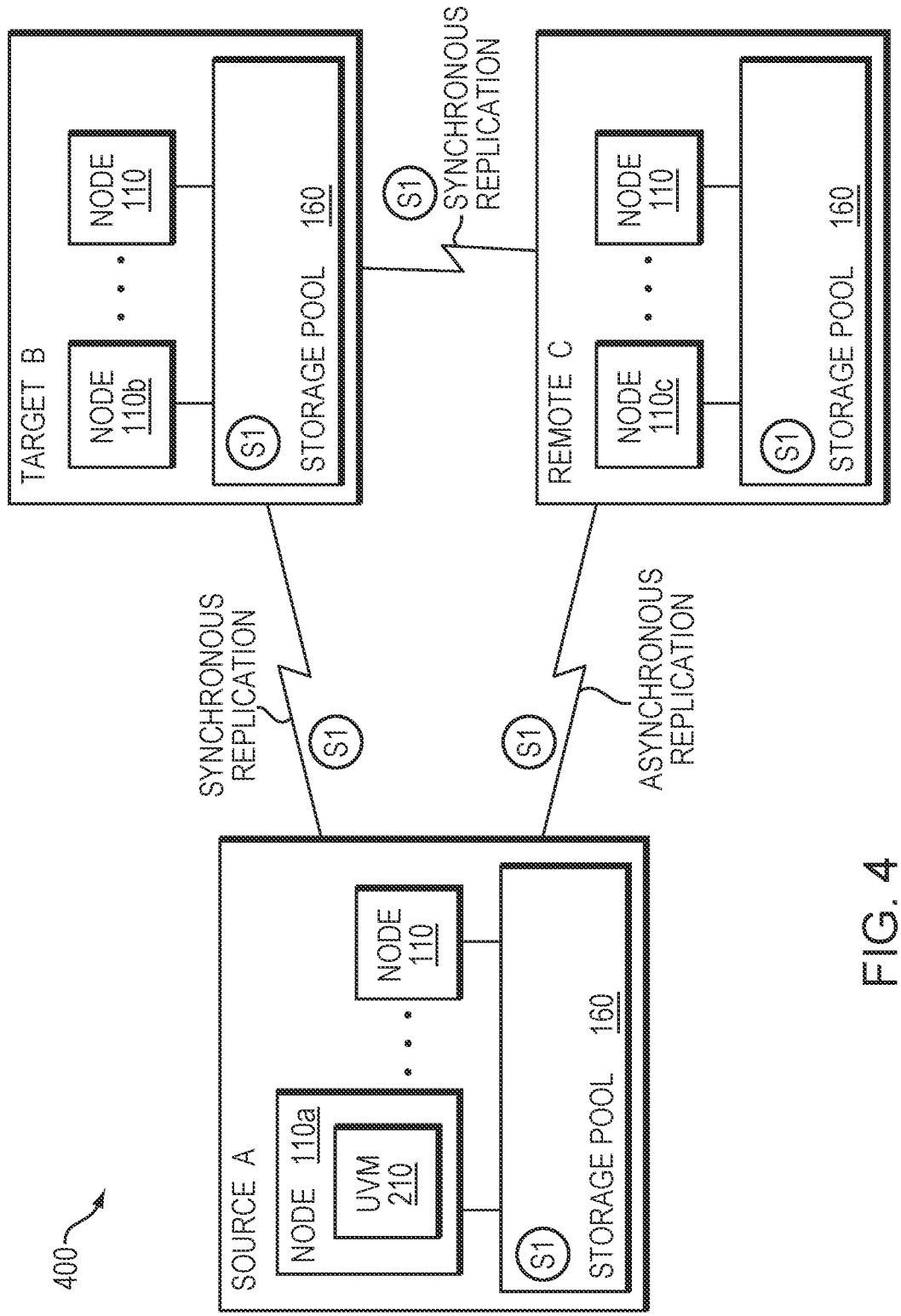
FIG. 4 is a block diagram of an exemplary multi-site data replication environment configured for use in various deployments such as for backup and/or disaster recovery.

FIG. 4 is a block diagram of an exemplary multi-site data replication environment configured for use in various deployments, such as for backup and/or disaster recovery (DR). Illustratively, the multi-site environment 400 includes three sites: source A, target B and remote C, wherein each site represents a datacenter embodied as a cluster 100 having one or more nodes 110. A category of data (e.g., one or more UVMs 210) running on source node 110a at source A is designated for failover to target B (e.g., target node 110b) in the event of failure of source A. A first snapshot S1 of the data is generated at the source A and replicated (e.g., via synchronous replication) over a network to target B as a base or "common" snapshot S1 used as a recovery point (RP). The snapshot S1 is also replicated from source A to remote C using asynchronous replication.

Replication (copying) of data typically results in constant transfer of the data over the network spanning the geographical areas in the multi-site data replication environment, which may be costly and expensive, as the network is often poorly utilized leading to needless replication with commensurate bandwidth reduction. Moreover, replication from the source to the target and/or remote may occur over a lossy network, where ordered replication (e.g., sequential data replication) may be greatly affected as a data sequence may be disparately impacted by a minor data loss. For example, a "slow" block somewhere at the start of a replication range may prevent the "highest completed offset" from moving forward, which may result in a large part of the replication range being restarted even though most blocks in the range have been replicated.

In addition, the multi-site environment typically tracks replication progress only at the source. Although this works well in a simple source-to-target bilateral configuration, progress tracking at the source is not useful in a multi-site configuration involving replication between different pairs of sites, e.g., if the source is down and replication is restarted from the beginning between the target and remote, which results in delayed protection of an entity at target. For example, assume a snapshot S1 of failover data is replicated from source A to target B using synchronous replication and S1 is replicated from source A to remote C using asynchronous replication. If source A becomes unavailable to continue operation mid-way through replication, S1 may have to be entirely (synchronously) replicated from targets B to C, i.e., from the start, resulting in delayed protection of an entity at target B.

The embodiments described herein are directed to a technique configured to present progress tracking state relating to data replicated as a recovery point (RP) from a source site to one or more target sites (targets) and/or remote sites (remotes) over a network in a multi-site data replication environment. The progress tracking state of the replicated RP, i.e., RP replication progress, is repeatedly persistently stored as a progress tracking recording (record) at the target independent of the source of the replication and presented (i.e., viewed) using a well-defined, published application programming interface (API) that is publicly callable by one or more clients (software applications) of the environment. Replication from the source to the target may occur over a (lossy) network, where data that is replicated in sequence may be occasionally dropped by the network. The replication progress tracking technique described herein enables identification and re-replication of dropped data ranges ("holes") in the replication so that holes may be re-replicated, without having to needlessly re-replicate data that was previously successfully replicated to the target.

In an embodiment, the state of the replication is constantly updated to reflect the status of replication. For example, the client at a source may receive an acknowledgement from the target that certain replicated data has been persistently stored at the target and the progress tracking record is updated to reflect the successful replication. However, the progress tracking record may also be updated to reflect unsuccessful replication of certain data (e.g., ranges of data unacknowledged) where the network dropped (lost) the acknowledgement or where data replication was interrupted, thereby obviating persistent storage of certain data and return of acknowledgement. When data replication is interrupted, e.g., because of a network or source failure, a progress tracking record reflecting the interruption of replication is stored, which thereafter may be used to resume replication from the point at which the interruption occurred.

Note that the recorded progress tracking state of successfully replicated RP data is typically not contiguous. That is, if 100 MB of data was replicated prior to interruption of data replication, it is unlikely that entire replicated data was successfully acknowledged (i.e., all data persistently stored at the target and acknowledgements returned) prior to resumption of replication continuing after the 100 MB of data. Instead, there may be non-contiguous gaps or holes in the 100 MB of replicated data and, therefore, a fine-granular tracking feature of the technique may be employed to identify those holes in the RP replication.

Figure 5:
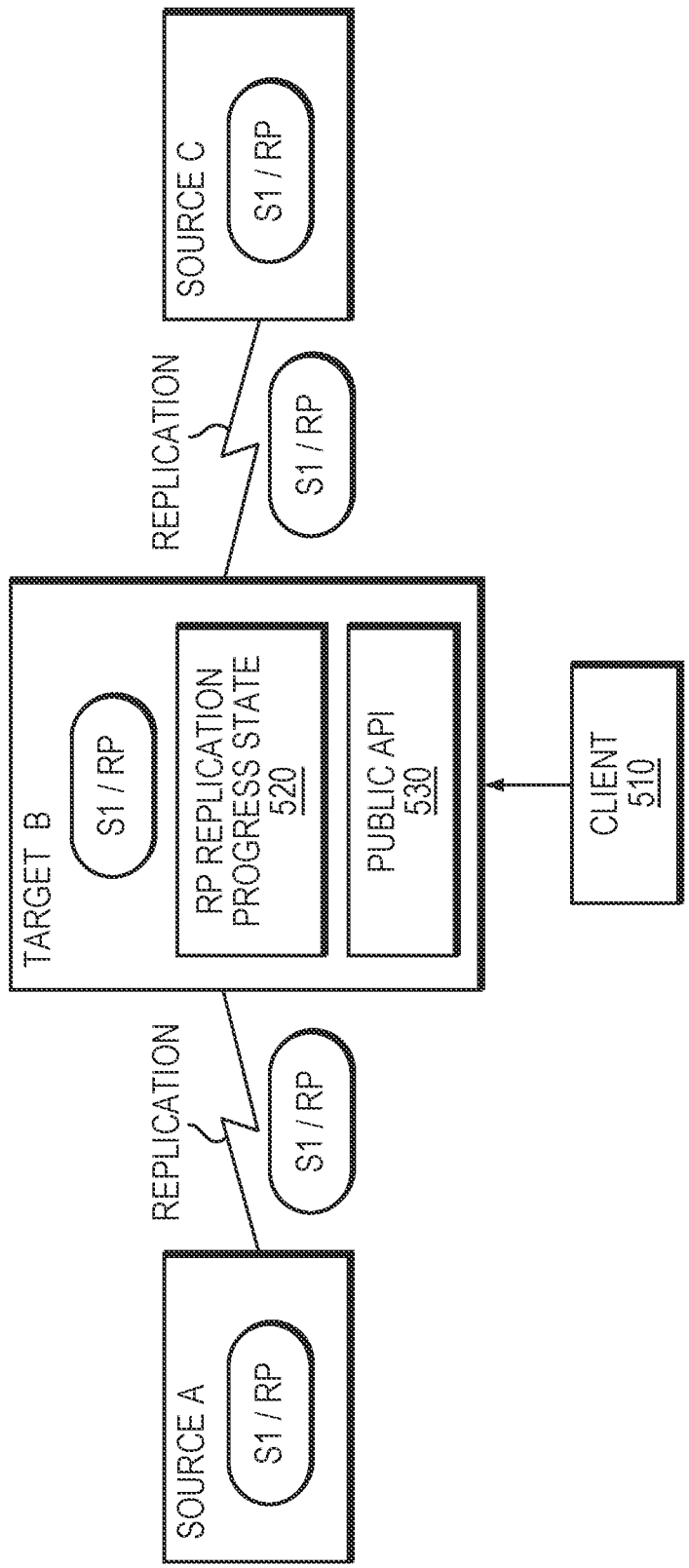
FIG. 5 is a block diagram illustrating a replication progress tracking technique.

FIG. 5 is a block diagram illustrating the replication progress tracking technique. Assume a client 510 (e.g., an XML client) initiates replication of a snapshot, e.g., S1 used as a RP, from a source A to a target B. The progress tracking state of the replicated RP, i.e., RP replication progress state 520, is persistently stored as a progress tracking recording (record) at the target B independent of the source of the replication and presented (i.e., viewed) by client 510 using the publicly callable API (i.e., public API 530). In the event of a failure or interruption of replication at the source A, the client 510 can continue the replication from a snapshot copy of the RP residing at another location (e.g., an alternate source C) using the RP replication progress state 520. The replication progress tracking technique thus includes the ability for a client 510 to use the public API 530 to continue data replication at the source C in the event of interruption at the source A by accessing the RP progress tracking state 520 stored as a persistent record at the target B.

Moreover, if the source A fails during initial replication of the RP fail, the client 510 may examine the replication progress tracking state 520 for the RP at the target B to determine the holes from the initial replication. The client 510 may then replicate only the missing data of those holes from source C to complete replication of the RP. Previous implementations stored the progress tracking state as a persistent record at the source and, as a result, could not accommodate such coordination enabled by persistent storage of the record at the target (which is shared among the sources). That is, storage of the progress tracking state 520 at the target B allows the client 510 to examine the persistent replication progress record associated with the RP to determine the state of the RP replication progress.

In an embodiment, the public API 530 illustratively employs the replication manager 320a or a similar high-level control plane service (hereinafter referred to as replication engine 320) of the cluster to manage the replication operation and replication progress tracking. That is, the replication progress tracking technique provides a raw public API 530 to start the replication using the replication engine 320, and query/set the progress tracking record. A client 510 may examine the state of the progress tracking record at the target to determine any ranges that are needed to fill-in holes, and then instruct the replication engine 320 to initiate (re)replication of those ranges. Illustratively, the progress tracking record is persistently stored and maintained in a database (e.g., table) configured with "watch" capabilities that enable clients to install watches, resulting in call backs to the clients when updates occur. The client 510 can then use the public API 530 to access the actual progress tracking information.

In an embodiment, the replication progress tracking technique provides a plurality of progress tracking modes (e.g., algorithms) that may be employed to present the state of the RP replication progress via the public API 530. The progress tracking modes may include a simple algorithm that presents the highest range of data, e.g., bytes, for a RP that has been replicated, as well as more complex algorithms that provide the fine-grained tracking aspect of the RP replication progress. For example, such an algorithm may embody one or more probabilistic data structures (e.g., cuckoo filters or Bloom filters) to allow use of a fixed size progress tracking structure to track by probability of the magnitude of progress any amount of data being replicated. Use of the probabilistic data structures may require re-replication of previously replicated data, but the amount of tracking metadata maintained by the structures is substantially small compared to the size of data being replicated. Yet another algorithm may be directed to maintaining progress tracking state relating only to missing data ranges or holes (i.e., data not yet successfully replicated) with any ranges not maintained being considered as successfully replicated.

Illustratively, the replication progress tracking technique enumerates five (5) progress tracking modes, any of which may be employed by the public API 530 to enable RP replication progress tracking. Of course, it will be understood to those skilled in the art that other progress tracking modes may be utilized in accordance with the technique described herein. The public API 530 exposes those modes or types of replication progress tracking state, and the client may select the type of state and information to use. For example, the modes may illustratively include:

Mode 1—tracks in-progress blocks (or indices of units of transfer) where some blocks may have been successfully replicated and others may have not. Tracking in-progress blocks may be foremost when completion of requests is fragmented. However, there is a limit to the maximum number of blocks outstanding, e.g., [10, 11, 12, 15, 20, 21, 23, 25, 26, 27]

Mode 2—tracks ranges of in-progress blocks, such as fixed-sized blocks. Tracking ranges of in-progress blocks (or the index of units of transfer) may be foremost when the completion of requests occurs in batches. Note that unacknowledged blocks (or indices) are represented as ranges, e.g., [(10, 12), 15, (20, 21), (25,27)]

Mode 3—tracks blocks with columnar compression. This mode may be foremost when a large list of blocks or indexes may be outstanding.

Mode 4—tracks unacknowledged blocks using a probabilistic data structure, such as a cuckoo filter, along with two indexes (i.e., "highest sequentially completed" and "highest transmitted" block index). This mode may be configured to track holes by maintaining information relating to unacknowledged transmissions. A probabilistic data structure may be suitable to reduce tracking space overhead in exchange for a small percentage of retransmissions, which is a side-effect of the probabilistic nature of the data structure. For example, a block/index may be inserted into an "unacknowledged cuckoo filter," and the "highest transmitted block/index" is tracked. The block/index is removed from the "unacknowledged cuckoo filter" when an acknowledgment arrives. In the event of a restart, starting from the "highest sequentially completed" block/index, the "unacknowledged cuckoo filter" is checked if a block/index is present. If the block/index is not present, then it was either acknowledged or was never inserted, i.e. it was not present in the diff. In either case, there is no need to re-replicate the relevant block. However, if the block/index is present, that block/index may not have been acknowledged or is the result of a false positive (small probability), and the block is re-replicated.

Mode 5—involves range-based collection, but tracks bytes in ranges instead of fixed sized blocks. This mode enables byte-level tracking of replication progress and operates seamlessly even if block-based replication is used.

Essentially, the public API 530 may be configured according to mode described above to return a type of progress tracking information or state that the client can interpret. Some clients 510 may only be able to interpret simple contiguous linear progression, whereas other clients may be able to interpret more complex non-contiguous ranges of missing data or holes in the replication. Other clients 510 may be capable of interpreting probabilistic data structures that provide high probability that certain ranges of data are lost. The various progress tracking modes may identify dropped or missing data ranges ("holes") that may have occurred during replication from the source to the target. A client utilizing the public API 530 may employ the fine-grained tracking aspect of the RP replication progress to identify and fill-in the holes associated with ranges of data dropped during RP replication over the network. The dropped or missing data ranges may then be re-replicated, without having to re-replicate data that was previously successfully replicated to the target.

In an embodiment, the replication progress tracking technique provides real-time progression of the current state of replication by, e.g., configuring the public API 530 to expose ranges of data that have been successfully replicated. The client may utilize those exposed ranges (i.e., progress tracking state) to complete the replication of a RP through fine-granular re-replication of holes. Alternatively, the client may re-replicate the entire RP (from start) if only a small percentage of data has been successfully replicated prior to interruption. Any of the enumerated progress tracking modes may be used.

Illustratively, the public API 530 may be embodied as a viewer configured to manage (e.g., query and/or set) information constituting the state of the RP replication progress. To that end, the technique includes two instances of the public API: (i) a Query RP replication API and (ii) a Set RP replication progress API. The Query RP replication API is configured to query (request) information about the RP and elicit a Get RP response that includes progress tracking state describing the RP replication status (e.g., partially complete). The Set RP replication progress API is configured to set the progress tracking mode associated with a type of replication progress tracking state to be recorded. The Set RP replication progress API may be called initially to establish the progress tracking mode used to record the type of progress tracking state stored at the target.

Figure 6:
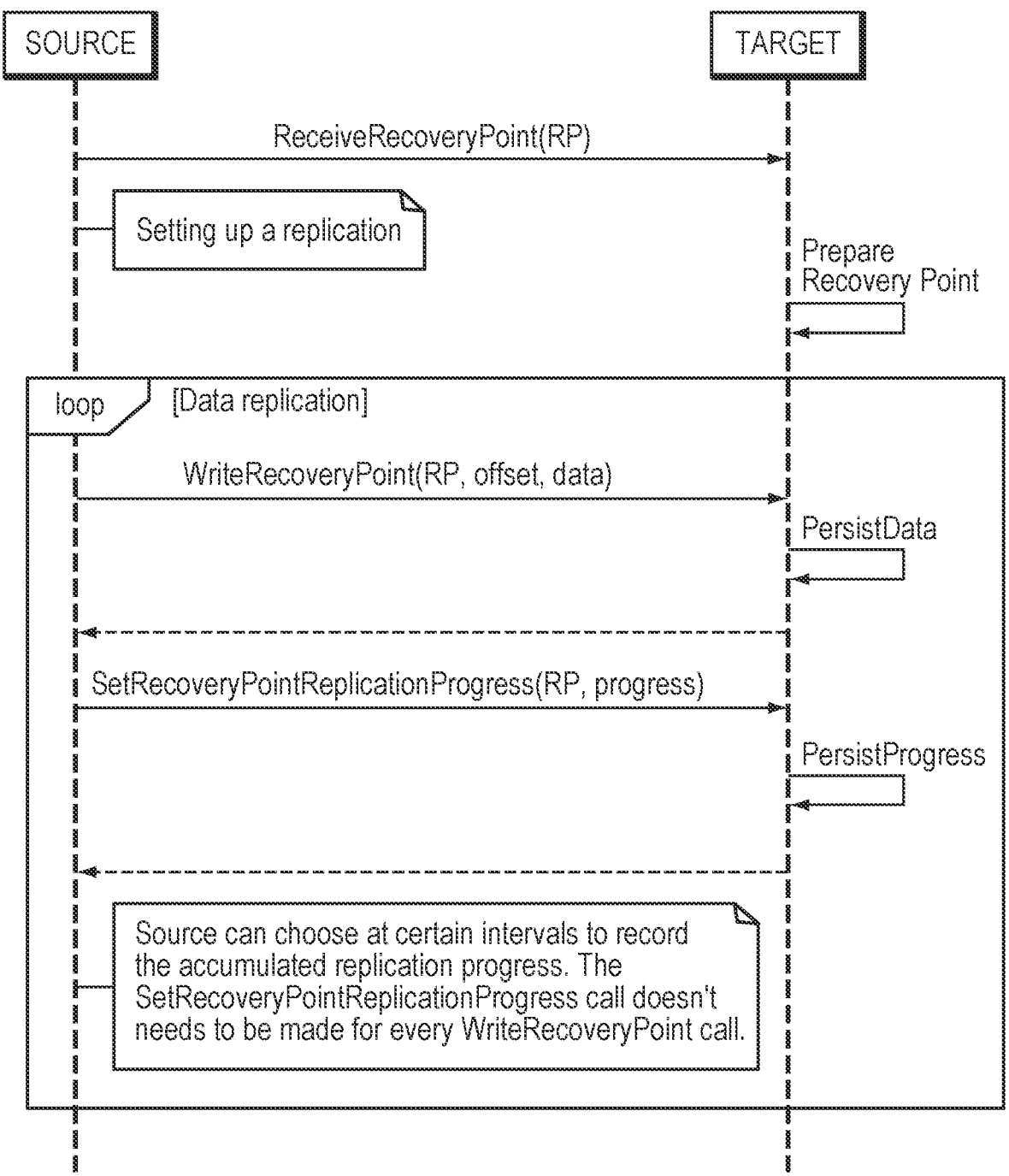
FIG. 6 is a flow diagram illustrating an embodiment of the replication progress tracking technique.

FIG. 6 is a flow diagram illustrating an embodiment of the replication progress tracking technique. Assume a RP on the source is replicated to a target. The source sets up the replication by, e.g., creating metadata on the target indicating replication of the RP is about to start (e.g., ReceiveRecoveryPoint(RP)). In response, the target prepares the recovery point (RP). Note that the replication progress tracking record is initially empty at the target. Data replication then progresses from the source to the target, e.g., WriteRecoveryPoint(RP, offset, data), with the data being persisted at the target. The source may use the Set RP API, e.g., SetRecoveryPointReplicationProgress(RP, progress) to persist and continuously update the state of the RP replication progress during replication (which, for large amounts of data, may be substantially long) as ranges of data are (successfully) replicated and acknowledged at the target. Notably, the source can elicit recordation of the replication progress via the Set RP API at periodic intervals independent of an amount of data replicated, so that the SetRecoveryPointReplicationProgress API call need not be made for every WriteRecoveryPoint API call. When the source receives acknowledgement that all data of the RP has been replicated at the target, the RP is finalized and the progress tracking record may be cleared.

In addition to presenting different types of progress tracking state based on different modes, the public API 530 may also facilitate cooperation between different entities (e.g., clients). For example, one entity (e.g., client) may manage the RP data replication and create the progress tracking record/information, whereas another entity (e.g., another client) may use the tracking state to leverage the RP data. Both clients may specify the tracking algorithm used to enable such cooperation, which may be the same or different according to client requirements. Accordingly, different clients may simultaneously use different progress tracking modes. That is, two or more different types of tracking information may be recorded for a same replication according to requests by the different clients. For example, a different client (different from the client initiating RP replication) may monitor the progress tracking record for the RP at the target and, upon detecting an unacknowledged range of replication data (hole), fill-in that hole through replication of the unacknowledged range to contribute the missing data to that RP. As another example, a first client may replicate data for a first RP to the target. A second client may use the first RP as a reference to replicate a second RP to the target that depends on the first RP, wherein replication of data for the second RP may involve a small delta (small amounts of changes) between the first and second RPs at the target.

In another embodiment, a user of the data (i.e., a client that is consuming the RP) may consume certain ranges of data that have been successfully replicated and acknowledged (as manifested by the progress tracking record), while the holes remain unavailable for consumption (i.e., data is not yet replicated). A second level implementation may leverage the data that has been successfully replicated and only re-replicate the holes to complete the ranges of the RP data to meet immediate demand use. Additionally, there may be a situation where a first RP (RP1) is an earlier snapshot and a second RP (RP2) is a later snapshot that depends on the data of RP1. RP1 may have a large amount of data to transfer (replicate). During replication of the RP1 data, RP2 can take advantage of the fact that some amount of RP1 data has been successfully replicated. RP2 can reference the successfully RP1 replicated data and proceed to replicate the RP1 data that has not been replicated, in parallel (i.e., concurrently).

The replication progress tracking technique also enables multiple sources to coordinate through the target with respect to their RP replication. For example, a first client may replicate RP1 from source A (source 1) to target B and a second client may replicate RP2 from a different source C (source 2) to target B. Note that the RP replication progress tracking record is maintained at the target B. By maintaining the progress tracking record at target B, the second client may examine the progress tracking record and determine which data of RP1 has been successfully replicated by the first client to leverage RP2 replication by filling in holes from RP1 replication. That is, different sources having the same data may be used to replicate portions of that data to a target while replication of the data as a whole is in progress to the target.

Figure 7:
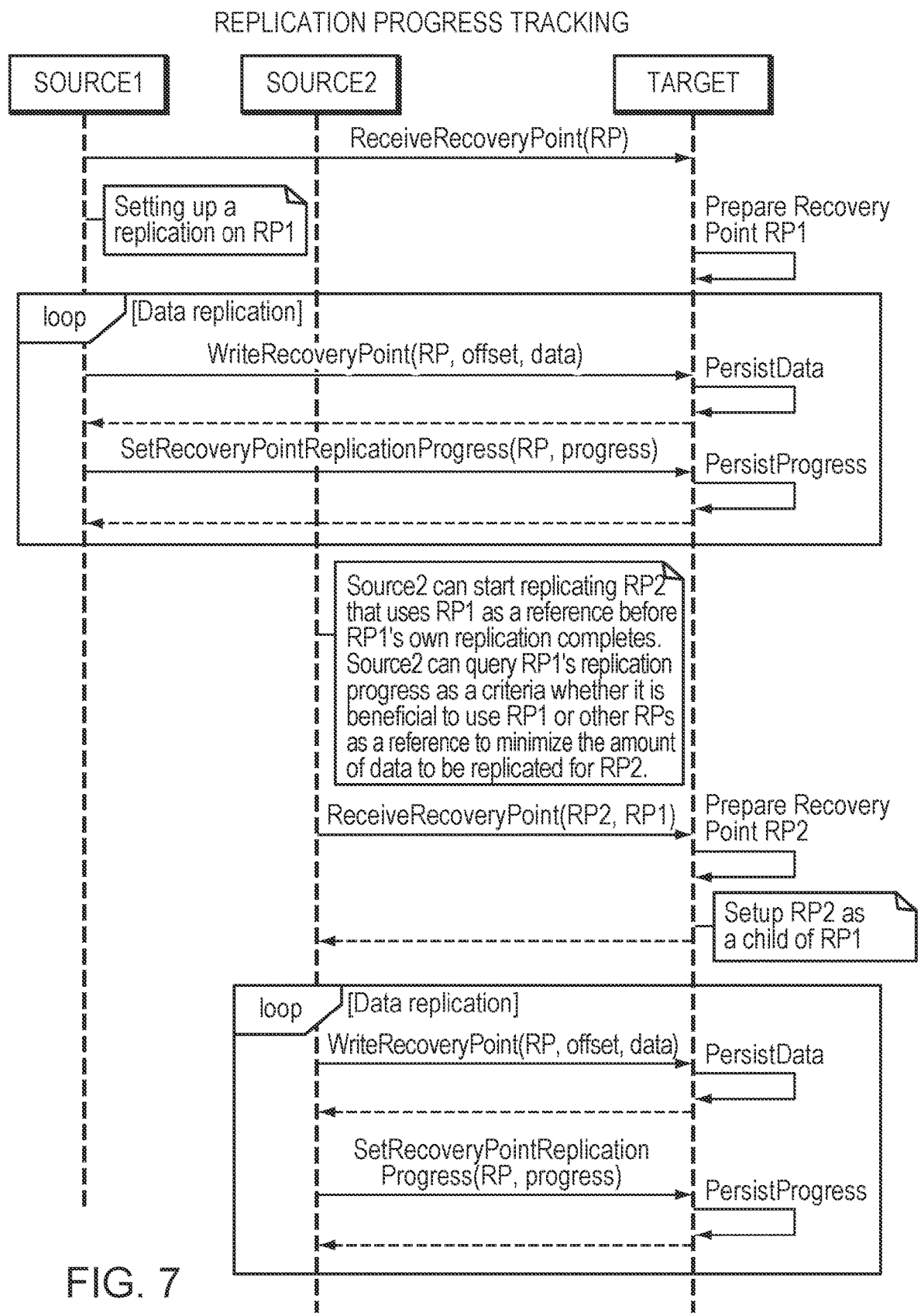
FIG. 7 is flow diagram illustrating another embodiment of the replication progress tracking technique.

FIG. 7 is a flow diagram illustrating another embodiment of the replication progress tracking technique. Sources 1 and 2 may be on-premises clusters that utilize the public API 530 and the target may be a cluster (or appliance) of a cloud service provider (CSP). That is, source 1 may be a first on-premises cluster (datacenter), source 2 may be a second on-premises cluster (different datacenter) and the target could be an appliance, e.g., a long-term snapshot service (LTSS) appliance, operating at the CSP. Sources 1 and 2 may coordinate to replicate RPs to the CSP. In an embodiment, source 1 may be an on-premises cluster that replicates a RP to the LTSS and source 2 could be a cloud cluster replicating the RP to LTSS. The RP replication progress tracking technique allows different source clusters at different locations to coordinate replication to a target. Note that networks coupling the sources to the target may have different data links with differing degrees of lossy-ness (e.g., service interruption and reliability of data transport) leading to loss of different ranges of data, especially during lengthy replications. Notably, ordered replication (e.g., sequential data replication) may be greatly affected as a data sequence may be disparately impact by a minor data loss. As a result, source 2 may, based on query of source 1 replication progress as a criterion, determine whether it is beneficial to use the RP or another RP as a reference so as to reduce an amount of data to be replicated.

In another embodiment, source 1 may be an on-premises cluster, the target is an on-premises cluster or LTSS appliance, and source 2 is a backup application that pulls data from the target and replicates the data for backup to source 2, e.g., another on-premises cluster. Assume 1 TB of data is replicated from source 1 to the target. A backup application executing at source 2 does not have to wait until the entire 1 TB of data is successfully replicated to begin its backup operations; source 2 can begins its operations as soon as some data is successfully replicated by examining the progress tracking record associated with the replication. That is, the backup application can promptly pull the successfully replicated data from the target and back it up to the other source cluster in parallel (i.e., concurrently) to replication of the 1 TB of data.

The replication progress tracking technique is useful in deployments with long-haul networks having constrained bandwidth and large amounts of data to be replicated, where work can begin in parallel as replication is in progress by identifying the actual data ranges that have been successfully replicated. The technique not only allows detection of missing data ranges (holes) but also allows applications to begin executing as long as the needed data has been successfully replicated.

The public API 530 is an enabling API that allows performance of work during in-progress replication based on knowledge of which data has been successfully replicated. The replication progress tracking technique is directed to progress tracking using RP replication state (information) retrieval or accessed by the public API. The progress tracking modes are accessible through the public API to enable tracking or RP replication progress by a client using any of the above-enumerated modes.

In summary, the embodiments are directed to a replication progress tracking technique for presenting progress tracking state according to one or more modes for tracking that is persistently stored at a target independent of one or more sources of the replication. Different progress tracking modes can be employed and possibly used simultaneously, if requested, for a replication to present the progress tracking state via a public API. Two instances (types) of the public API are a Query RP replication API and a Set RP replication progress API. The Query RP replication API is adapted to request information about the RP and elicit a Get RP response that includes progress tracking state about the RP replication status (e.g., partially complete). The Set RP replication progress API sets the mode used to record a type of progress tracking state to be recorded. The Set RP replication progress API is called initially to establish the progress tracking mode used to record the type of progress tracking state stored at the target. The client (entity) that initiates replication of the RP and the entity that uses the RP may cooperate on the type of progress tracking mode employed. Notably, the entity initiating RP replication can set multiple modes that provide multiple types of progress tracking state to be recorded at the target.

Advantageously, the replication progress tracking technique allows clients to save state, e.g., at the target, pertaining to replication of one or more RPs between sources and a target, and subsequently recover that state across sites without having to restart the entire replication procedure. The technique is particularly useful for deployment where large amounts of data are replicated over slow (or expensive) networks, such as when replicating the data to a cloud. Here it is desirable to avoid needless re-replication of data that was previously successfully replicated, particularly with respect to costly replication to/from the cloud. Accordingly, a client utilizing the public API can employ the fine-grained tracking aspect of the RP replication progress to fill-in the holes associated with data dropped during RP replication over the network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
configuring a first mode of progress tracking state stored as one or more progress tracking records for a recovery point (RP) replication of a first RP from a first source site to a target site via an application programming interface (API) at the target site;
performing the RP replication, wherein each progress tracking record is stored at the target site during the RP replication according to one or more API calls from the first source site as data is acknowledged as transferred;
querying the target site via the API to obtain the first mode of progress tracking state to identify ranges of data unacknowledged as transferred to the target site during the RP replication; and
re-replicating the identified ranges of data from the first source site to the target site.

2. The method of claim 1, wherein the first mode of progress tracking state includes tracking ranges of in-progress units of transfer when completion occurs in batches during the RP replication.

3. The method of claim 1, wherein the first mode of progress tracking state includes tracking of blocks with columnar compression.

4. The method of claim 1, wherein the first mode of progress tracking state includes tracking unacknowledged transfers during the RP replication using a probabilistic data structure.

5. The method of claim 1 wherein querying the target site via the API further comprises obtaining the identified ranges directly via the API, wherein the first mode of progress tracking state includes tracking of missing ranges of data from the replication.

6. The method of claim 1 further comprising:
replicating the identified ranges of data from a second source site having the ranges of data to the target site concurrently with the RP replication from the first source site to the target site.

7. The method of claim 1 further comprising:
configuring a second mode of progress tracking state different from the first mode of progress tracking state stored as the progress tracking record for the RP replication via the API at the target site, wherein second mode of progress tracking state includes tracking of missing ranges of data from the RP replication;
querying the target site via the API to obtain the second mode of progress tracking state; and
replicating the missing ranges of data from a second source site having the ranges of data to the target site concurrently with the RP replication from the first source site to the target site.

8. The method of claim 1 further comprising:
determining whether it is beneficial to use the first RP or a second RP as a reference based on the query of the first mode of progress tracking state as a criterion.

9. The method of claim 1 further comprising:
configuring a second mode of progress tracking state for the RP replication from via the API, wherein the second mode of progress tracking state includes tracking ranges of in-progress units of transfer when completion occurs in batches during the RP replication;
querying via an application executing at the target site to obtain the second mode of progress tracking state; and
accessing via the application replicated data at the target site during the RP replication that is acknowledged as transferred according to the query for the second mode of progress tracking state.

10. The method of claim 1 further comprising:
using the first RP as a reference to replicate a second RP to the target site that depends on the first RP, wherein replication of the second RP involves incremental changes between the first and second RPs at the target site.

11. A non-transitory computer readable medium including program instructions for execution on a processor, the program instructions configured to:
configure a first mode of progress tracking state stored as one or more progress tracking records for a recovery point (RP) replication of a first RP from a first source site to a target site via an application programming interface (API) at the target site;
perform the RP replication, wherein each progress tracking record is stored at the target site during the RP replication according to one or more API calls from the first source site as data is acknowledged as transferred;
query the target site via the API to obtain the first mode of progress tracking state to identify ranges of data unacknowledged as transferred to the target site during the RP replication; and
re-replicate the identified ranges of data from the first source site to the target site.

12. The non-transitory computer readable medium of claim 11, wherein the program instructions configured to configure the first mode of progress tracking state includes program instructions configured to track ranges of in-progress units of transfer when completion occurs in batches during the RP replication.

13. The non-transitory computer readable medium of claim 11, wherein the program instructions configured to configure the first mode of progress tracking state includes program instructions configured to track blocks with columnar compression.

14. The non-transitory computer readable medium of claim 11, wherein the program instructions configured to configure the first mode of progress tracking state includes program instructions configured to track unacknowledged transfers during the RP replication using a probabilistic data structure.

15. The non-transitory computer readable medium of claim 11, wherein the program instructions configured to query the target site via the API are further configured to obtain the identified ranges directly via the API, wherein the first mode of progress tracking state includes tracking of missing ranges of data from the replication.

16. The non-transitory computer readable medium of claim 11, wherein the program instructions further include program instructions configured to:
replicate the identified ranges of data from a second source site having the ranges of data to the target site concurrently with the RP replication from the first source site to the target site.

17. The non-transitory computer readable medium of claim 11, wherein the program instructions further include program instructions configured to:
configure a second mode of progress tracking state different from the first mode of progress tracking state stored as the progress tracking record for the RP replication via the API at the target site, wherein second mode of progress tracking state includes tracking of missing ranges of data from the RP replication;
query the target site via the API to obtain the second mode of progress tracking state; and
replicate the missing ranges of data from a second source site having the ranges of data to the target site concurrently with the RP replication from the first source site to the target site.

18. The non-transitory computer readable medium of claim 11, wherein the program instructions further include program instructions configured to:
determine whether it is beneficial to use the first RP or a second RP as a reference based on the query of the first mode of progress tracking state as a criterion.

19. The non-transitory computer readable medium of claim 11, wherein the program instructions further include program instructions configured to:
configure a second mode of progress tracking state for the RP replication from via the API, wherein the second mode of progress tracking state includes tracking ranges of in-progress units of transfer when completion occurs in batches during the RP replication;
query via an application executing at the target site to obtain the second mode of progress tracking state; and
access via the application replicated data at the target site during the RP replication that is acknowledged as transferred according to the query for the second mode of progress tracking state.

20. The non-transitory computer readable medium of claim 11, wherein the program instructions further include program instructions configured to:
use the first RP as a reference to replicate a second RP to the target site that depends on the first RP, wherein replication of the second RP involves incremental changes between the first and second RPs at the target site.

21. An apparatus comprising:
a network connecting a first source site to a target site, the network further coupled to a node having a processor configured to execute program instructions to:
configure a first mode of progress tracking state stored as one or more progress tracking records for a recovery point (RP) replication of a first RP from the first source site to the target site via an application programming interface (API) at the target site;
perform the RP replication, wherein each progress tracking record is stored at the target site during the RP replication according to one or more API calls from the first source site as data is acknowledged as transferred;
query the target site via the API to obtain the first mode of progress tracking state to identify ranges of data unacknowledged as transferred to the target site during the RP replication; and
re-replicate the identified ranges of data from the first source site to the target site.

22. The apparatus of claim 21 wherein the first mode of progress tracking state includes tracking ranges of in-progress units of transfer when completion occurs in batches during the RP replication.

23. The apparatus of claim 21 wherein the first mode of progress tracking state includes tracking of blocks with columnar compression.

24. The apparatus of claim 21 wherein the first mode of progress tracking state includes tracking unacknowledged transfers during the RP replication using a probabilistic data structure.

25. The apparatus of claim 21 wherein the program instructions to query the target site via the API further include program instructions to obtain the identified ranges directly via the API, wherein the first mode of progress tracking state includes tracking of missing ranges of data from the replication.

26. The apparatus of claim 21 wherein the program instructions further include program instructions to:
replicate the identified ranges of data from a second source site having the ranges of data to the target site concurrently with the RP replication from the first source site to the target site.

27. The apparatus of claim 21 wherein the program instructions further include program instructions to:
configure a second mode of progress tracking state different from the first mode of progress tracking state stored as the progress tracking record for the RP replication via the API at the target site, wherein second mode of progress tracking state includes tracking of missing ranges of data from the RP replication;
query the target site via the API to obtain the second mode of progress tracking state; and
replicate the missing ranges of data from a second source site having the ranges of data to the target site concurrently with the RP replication from the first source site to the target site.

28. The apparatus of claim 21 wherein the program instructions further include program instructions to:
determine whether it is beneficial to use the first RP or a second RP as a reference based on the query of the first mode of progress tracking state as a criterion.

29. The apparatus of claim 21 wherein the program instructions further include program instructions to:
configure a second mode of progress tracking state for the RP replication from via the API, wherein the second mode of progress tracking state includes tracking ranges of in-progress units of transfer when completion occurs in batches during the RP replication;
query via an application executing at the target site to obtain the second mode of progress tracking state; and
access via the application replicated data at the target site during the RP replication that is acknowledged as transferred according to the query for the second mode of progress tracking state.

30. The apparatus of claim 21 wherein the program instructions further include program instructions to:
use the first RP as a reference to replicate a second RP to the target site that depends on the first RP, wherein replication of the second RP involves incremental changes between the first and second RPs at the target site.

* * * * *